[11] 3,624,497

[72] Inventors Jacques Max
Saint-Egreve;
Francis Merdrignac, Grenoble; Jules Ratahiry, Grenoble, all of France
[21] Appl. No. 802,484
[22] Filed Feb. 26, 1969
[45] Patented Nov. 30, 1971
[73] Assignee Commissariat A L'Energie Atomique
Paris, France
[32] Priority Mar. 1, 1968
[33] France
[31] 142 151

[54] METHOD AND APPARATUS FOR MEASURING THE SLOPES OF ELECTRIC PULSES WHICH MAY BE ACCOMPANIED BY HIGH-BACKGROUND NOISE
11 Claims, 6 Drawing Figs.

[52] U.S. Cl. ............................................. 324/77 R,
235/196, 307/231, 328/161, 351/7, 324/140
[51] Int. Cl. .......................................... G01n 23/16
[50] Field of Search ............................... 324/77, 99
D, 140; 235/196; 351/7, 1; 328/161, 114, 132; 307/229, 231; 128/2.06, 2.1

[56] References Cited
UNITED STATES PATENTS
3,024,999 3/1962 Heacock, Jr. ................. 235/196

*Primary Examiner*—Edward E. Kubasiewicz
*Attorney*—Craig, Antonelli and Hill

ABSTRACT: In order to measure the slopes of pulses which make up a signal which may be accompanied by high-background noise, a sawtooth wave of slope is generated. The sawtooth wave is generated in synchronism with each pulse of the signal and the amplitude of each pulse is continuously divided by the amplitude of the sawtooth wave.

METHOD AND APPARATUS FOR MEASURING THE SLOPES OF ELECTRIC PULSES WHICH MAY BE ACCOMPANIED BY HIGH-BACKGROUND NOISE

The present invention is directed to a method and a device for measuring the slope of pulse phases which each exhibit a substantially linear rise in a pulse train constituting an electric signal which may be accompanied by a very high level of background noise. One important application of the invention among many others consists in the utilization of signals representing physiological parameters for the purpose of bringing out the most important characteristics.

One known method which is already employed for the purpose of measuring the slope of an electric signal whose amplitude varies substantially at a linear rate in time consists in differentiating said signal in a suitable circuit. In practice, this solution is no longer acceptable when the slope is low, that is to say when the amplitude of the signal varies slowly in time and/or when the useful signal is superimposed on a high background noise.

The present invention is directed to the basic concept of a method and device for measuring pulse slope in which the disadvantages of the usual methods are reduced to a considerable extent and which, in particular, are not subject to the limitations referred to above.

With this objective, the invention proposes a method of measurement of the slope of electric pulses constituting a signal which is accompanied by a high background noise, wherein said method consists in generating a sawtooth wave of known slope at the instant of appearance of each pulse and in dividing the amplitude of said pulse by the amplitude of the sawtooth wave at the same instant.

The invention also proposes a slope-measuring device for the application of the method aforesaid. Further arrangements which are also provided by the invention can advantageously be combined with the preceding but can also be employed separately. These arrangements will be more clearly brought out by the following description of one form of execution of the invention corresponding to a particular application which is given solely by way of nonlimitative example and which consists of a device for studying nystagmic jerks of the eyeball. The description refers to the accompanying drawings, wherein:

Before describing the method and device according to the invention, it may prove useful to recall the nature of nystagmic jerks and the object of their study.

If periorbital cutaneous electrodes are applied to a patient who is subjected to periodic excitation (usually a pendular motion imparted to the patient by means of an armchair in which the patient is supported), a so-called nystagmic signal is collected. This signal is made up of a series of pulses, each pulse having a so-called slow phase with a small angle of slope which is approximately constant and a return phase having a steep slope. The polarity of the signal is reversed with the direction of rotation of the armchair The appearance of a series of pulses corresponds to a reversal of motion of the armchair and the first slow phase has the smallest angle of slope. At the time of stopping prior to reversal of the direction of rotational motion of the chair, there is a period in which no significant pulses appear.

Figure 1:
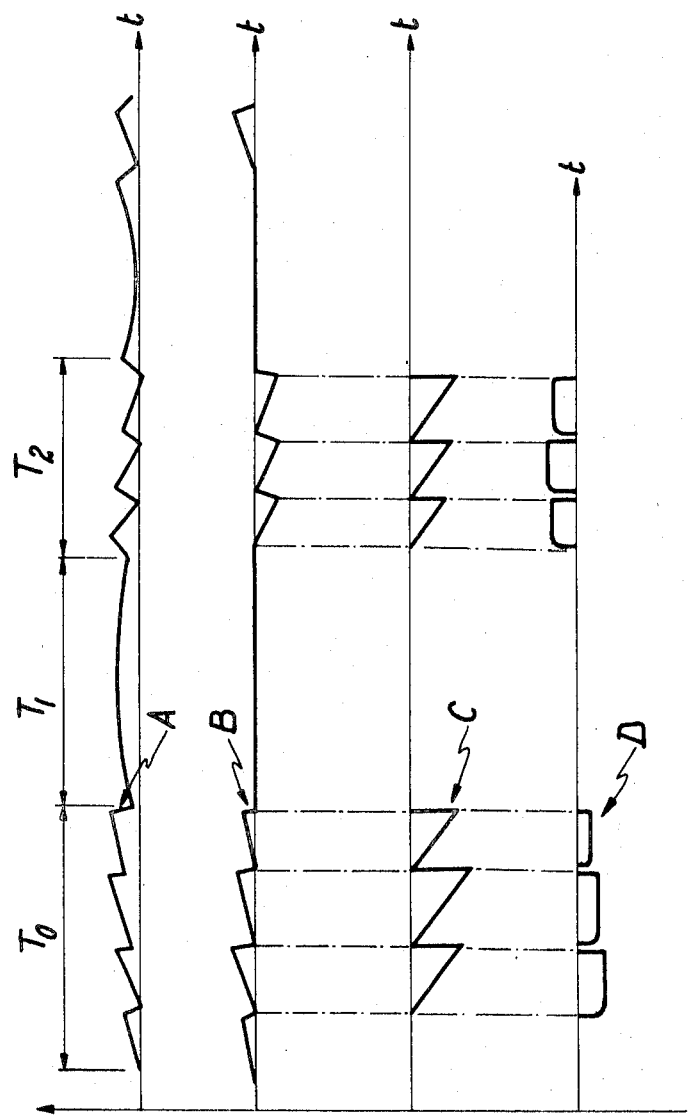
FIG. 1 is a diagram showing the shape of the variation in time of the nystagmic signal (curve A), of the same signal after centering (curve B), of the superimposed sawtooth signal (curve C) and of the ratio of the signals (curve D)

The curve A which is given in FIG. 1 shows a first period $T_0$ in which there appear four pulses corresponding to the rotation of the chair in one direction followed by a period $T_1$ which is devoid of characteristic signals, then by a period $T_2$ (corresponding to a rotation in the opposite direction) comprising signals whose slow phases are of opposite slope with respect to the slope of the pulses of the period $T_0$.

The pulses which are recorded and which correspond to nystagmic jerks of the eyeball constitute an important element of vestibular exploration. The "low-gradient" phase of each pulse is the phase which corresponds with the highest accuracy to the excitation which is derived from the labyrinth and proceeds towards the nerve centers while the "high-gradient" phase has a much more complex interpretation. It has become apparent that the following rank among the most characteristic parameters: the mean angle of slope of the low-gradient or "slow" phases, the mean value of these angles of slope as determined over a given period of time, and the number of pulses (corresponding to the number of nystagmic jerks) with either polarity during a given time interval.

The device which will now be described is intended to perform the functions mentioned above. It will readily be appreciated that, in the achievement of this objective, the design and development of a device which permits the extraction of the parameters referred to give rise to a number of problems:

the signal has a high level of background noise which prevents direct measurement by differentiation;

the presence of pulses in one direction and in the other–some slow phases can have a slope which is close to that of the "fast-return" phases of pulses of opposite direction–entails the presence of circuits which make it possible to discriminate between the slow phases and the fast-return phases. As will be seen later, this discrimination utilizes the presence of time intervals during which no signal to be processed appears between two pulse trains of opposite polarity.

The basic principle of the invention is as follows: a ratio is established between the amplitude of the slow phase and that of a sawtooth wave which is a linearly increasing function of time, the sawtooth wave being reduced to a zero or to a very small value as a result of the fast return which follows a low-gradient phase. The amplitudes are expressed as an electrical quantity which is usually a voltage.

In other words, there is effected a calculation of $x(t)$ as defined by:

$$x(t) = at + b(t)/a't + k \quad (1)$$

wherein:

$a$ represents the real slope to be determined;

$b$ represents the noise which is superimposed on the signal;

$a't+k$ represents the sawtooth wave which serves as a slope calibration standard, the constant $k$ being intended to prevent indetermination in respect of $t=0$ and of sufficiently low value to become negligible compared with $a't$ in respect of a value of $t$ which is a small fraction one-tenth for example) of the time duration of a single nystagmic jerk.

As soon as $k$ has become negligible compared with $a't$, we have:

$$x(t) = \frac{a}{a'} + \frac{b'(t)}{a't}$$

wherein the second term is very small compared with the first.

The division can evidently be performed continuously point by point in analog form or, after coding, in digital form.

Figure 2:
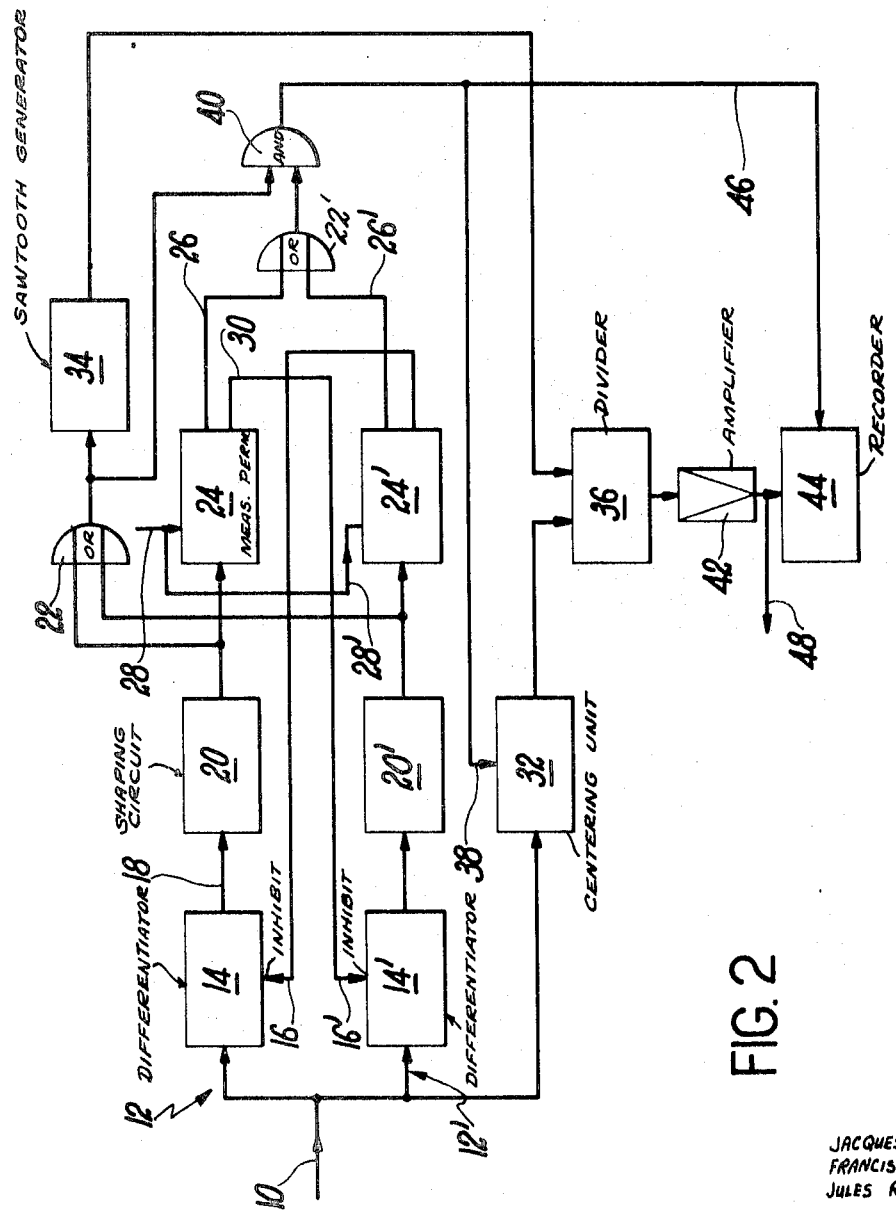
FIG. 2 is a highly diagrammatic block diagram of the device for supplying the slope ratio.

The device in accordance with the invention as illustrated in FIG. 2 may be regarded as comprising a parameter extraction circuit and an inhibition circuit which will be described in turn.

The signal which is taken directly from electrodes or preprocessed in a known device is applied at 10 to the input of the two circuits.

The inhibition circuit is composed of two identical arms 12 and 12' to each of which is assigned one pulse polarity: the arm 12, for example, comprises a differentiator 14 for the fast-return of positive pulses, said differentiator being provided with an inhibition input 16. The presence of a voltage at said input blocks the output 18 of the differentiator. This output 18 supplies a shaping circuit 20 which is connected on the one hand to one input of an OR- circuit 22 whose function will become apparent later and, on the other hand, to a measurement-permission circuit 24. This circuit 24 is of complex structure and must ensure that:

when a first pulse is applied to the input of the circuit 24, said pulse causes the emission at one output 26 of a voltage square wave having a time duration $\tau$ (1 second, for example) which is adjustable by the operator (this input being shown diagrammatically by the arrow 28) but does not result in the appearance of a signal at a second output 30 which is connected to the input 16' of the differentiator 14';

if a further input pulse which is separated from the first by a time interval less than $\tau$ (that is to say prior to the end of the square wave) is applied to the input, said pulse lengthens the square wave by a period equal to $\tau$ and initiates at the output 30 the emission of a square wave having a duration equal to the time which elapses between the initial nystagmus and the final nystagmus as increased by the value $\tau$; this square wave serves to inhibit the differentiator 14' which selects the negative pulses.

A number of different solutions are evidently open to selection in the design of the measurement-permission circuit 24. For example, it would be possible to adopt a circuit arrangement of the type shown diagrammatically in FIG. 5 which comprises:

a monostable circuit 80 controlled by means of a gate 82 of the field-effect transistor type, the control electrode of which is connected to the output of the circuit 20. This circuit 80 has two outputs 26 and 27;

an amplifying and shaping stage 84 which is coupled to the output 27 of the monostable circuit 80;

a trigger circuit for positive signals 86 and coupled to the output 27;

an amplifying and shaping stage 88 which is coupled to the output of the trigger circuit 86;

a logic state storage device 90, the two inputs of which are coupled to the gates 89 (output of stage 84) and 91 (output of stage 88) and which supplies the output 30.

The monostable circuit 80 which is shown in the figure is constituted by two transistors 92 and 94, the collector of the transistor 92 being connected to the base of the transistor 94 via the capacitor 96. Said circuit produces a square wave having a duration $\sigma$ if it is driven by a single pulse.

In the quiescent state, the transistor 94 is conducting and the transistor 92 is blocked. The first pulse which is derived from the shaping circuit 20 blocks the transistor 94 and makes the transistor 92 conducting by applying to the base of transistor 94 the positive voltage of the source +P. The collector of the transistor 92 then changes over from the voltage −P to a zero voltage.

The second pulse again applies to the voltage +P to the base of the transistor 94 and recharges the capacitor 96 at the voltage P; the current which serves to recharge the capacitor 96 flows through the resistor 98 which connects the collector of the transistor 92 to the voltage source −P. This current produces at the point 27 a positive voltage peak and causes the lengthening of the square wave derived from the monostable circuit 80 for the time duration $\sigma$.

The same process is repeated in the case of the other incident pulses which arrive at an instant corresponding to a time interval of less than $\sigma$ after the preceding pulses. There is collected at the output 26 a square wave having opposite polarity with respect to the square wave which appears at 27 and has no voltage peaks, which corresponds wholly to the definition given earlier.

The gate 84 delivers at 89 a square wave having the same polarity as the square wave which appears at 27 and which is also free from voltage peaks.

The circuit 86 operates as follows: as long as the signal at 27 is either negative or zero, the first transistor 100 is blocked and the second transistor 102 is in the conducting state: the output of the circuit is at a potential in the vicinity of zero.

When a positive peak arrives at 27, the transistor 100 becomes conductive and brings the output to a positive potential in the vicinity of +P. The stage 88 reverses the polarity of the pulses thus obtained. The logic state storage device 90 receives from the output 89 a trip permission signal in the form of a positive square wave; when this pulse is present, the device "remembers" or stores the first pulse which is derived from the output 91 and is reset at the end of the square wave which is emitted at the output 89.

Figure 5:
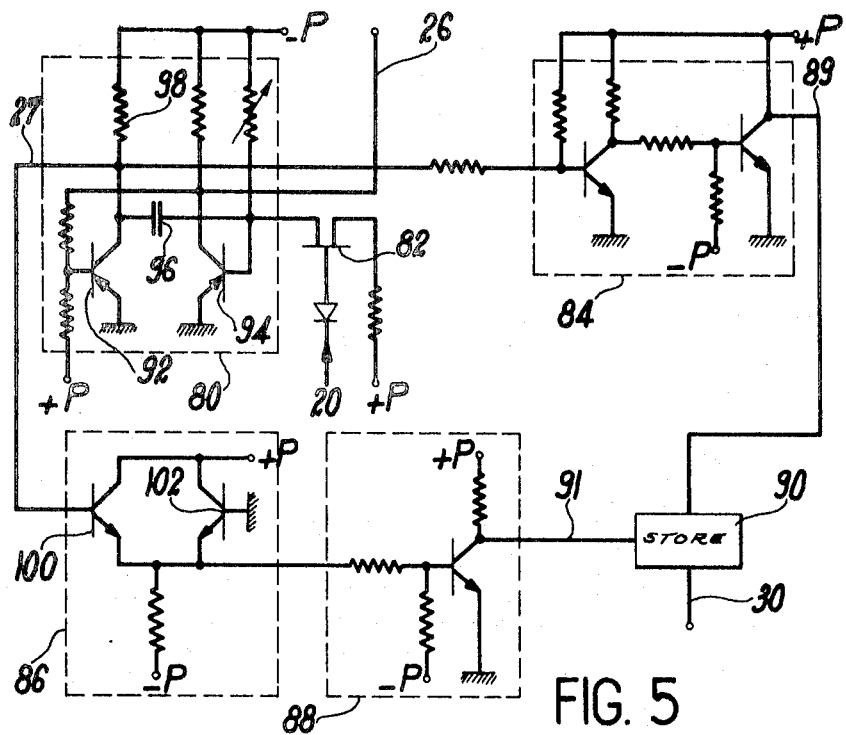
FIG. 5 is a possible diagram of the measurement utilization circuit of FIG. 2.
Figure 6:
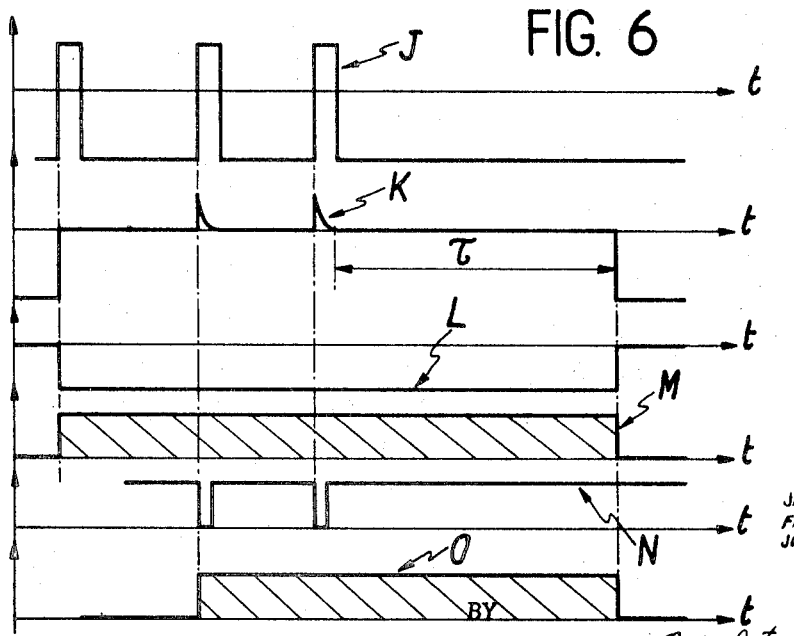
FIG. 6 is a diagram which is similar to FIG. 4 showing the shape of the signals which appear in the circuit of FIG. 5.

The shape of the signals which appear at the different points of the circuit 24 given in FIG. 5 is illustrated in FIG. 6: the curve J shows the signals at the output 20, the curve K shows the pulses which are delivered at the output 27 of the monostable circuit 80 each time a pulse of the curve J appears in less than a time interval $\sigma$ after the preceding and the negative voltage which appears at the end of a time interval $\sigma$ after final pulse. The curves L, M and N show the voltages at the outputs 26, 89 and 91 and it can be seen that there appears on the curve M a period (shaded portion) during which the logic storage device is permitted to trip followed by a reset. Finally, the curve O shows the voltage at the output 30 and the shaded zone corresponds to the period of inhibition of the channel 12'.

The operation of the inhibition circuit is apparent from FIG. 2: the first pulse of a series (separated from the last pulse of the preceding output by a time interval which is longer than $\sigma$) appears whereas neither of the two arms is inhibited. Said first pulse is selected by one of the arms 12 and 12' without any risk or error since it always begins with a slow phase. If the pulse is assumed to be positive, a square wave appears at the output 26. When a second pulse arrives at the end of a time interval which is shorter than $\sigma$ said second pulse causes the appearance of a square wave at the output 30 and the inhibition of the differentiator 14'; the arm 12' is thus inhibited throughout the series of positive pulses.

The duration of the time interval $\sigma$ is evidently chosen so as to be shorter than $T_1$ (FIG. 1): a duration of the order of one second is usually satisfactory.

The slope determination circuit is composed of a centering unit 32, a sawtooth wave generator 34 providing a known slope $a'$ which may be varied, an analog divider circuit 36 and logic control circuits. The sawtooth generator 34 is triggered by the OR-circuit 22 and is blocked when it is no longer supplied with current. In other words, the return of the pulses effects the calibration of the sawtooth waves (curve C of FIG. 1). It should be noted that the saw teeth start from a slightly positive voltage $K$ (formula 1). The generator 34 can consist of any conventional circuit. The so-called bootstrap generator which employs a normally blocked field-effect transistor as a switching unit is eminently suited to this purpose. A description of a circuit of this type can be found in the literature.

The centering unit 32 is supplied directly from the input 10 and reset at a zero output voltage when its control input 38 receives a signal following each fast return. This signal is supplied in the following manner (with the reference to FIG. 2): the OR-circuit 22 for triggering the sawtooth waves and a second OR-circuit 22' which is coupled to the outputs 26 and 26' (and which therefore delivers a voltage as long as one of the circuits 24 and 24' emits an inhibiting square wave) are coupled to the inputs of an AND-circuit 40. This circuit transmits to the input 38 a reset pulse to the input 38 at the beginning of each nystagmic pulse of a series.

The pulses which pass out of the centering unit 32 (curve B of FIG. 1) and which are identical in shape with the initial pulses but with an origin which is reset to zero are applied to one of the inputs of a divider 36. The other input receives the sawtooth waves (curve C of FIG. 1) of the generator 34.

Various types of analog dividers may be employed. For example, use can be made of a circuit assembly comprising an operational amplifier, the negative feedback loop of which is constituted by an amplitude-modulation and duration-modulation multiplier. Thus, the signal to be processed is applied to the multiplier while the sawtooth waves are applied to the input which is maintained at zero potential. A precision of the order of 1 in the division is thus readily achieved.

The device shown in FIG. 2 comprises at the output of the divider 36 an amplifier 42 which supplies an analog recorder 44, said recorder being also supplied from the output via line 46 of the AND-gate 40. A time delay is thus introduced in the triggering of the amplifier 32 with respect to the appearance of the corresponding sawtooth. Thus, the output square waves of the amplifier 42 (curve D in FIG. 1) appear only after the period of time in which the approximation made for the measurement of the slope is not permissible: this period of time appears on the curve D in the form of an interval between successive square waves. The recorder can be of a standard galvanometer type wherein the slope of each pulse will be represented by a square wave having a duration which is slightly shorter than that of the nystagmic jerk and the amplitude and polarity of which indicate the value of the slope and its sign.

There can be added to the basic circuit shown in FIG. 2 assemblies whereby the mean value of the slopes of the slow phases of nystagmic jerks can be supplied directly as calculated either on the basis of a given number of jerks or on the basis of a given time interval, such as, for example, a half-period of oscillation of the armchair corresponding to a same polarity of the jerks. It is possible for this purpose to utilize the circuit which is shown in FIG. 3, the input 48 of which is coupled to the output of the amplifier 42.

The principle of measurement of the mean value of slopes is as follows: the voltage square waves delivered by the amplifier 42 are converter to square-topped pulses having a constant predetermined duration and an amplitude which is proportional to the slope, said pulses being transmitted to a storage analog divider or, after summation of the amplitudes, the contents of the storage device are divided by the number of square waves (that is to say the number of jerks).

Figure 3:
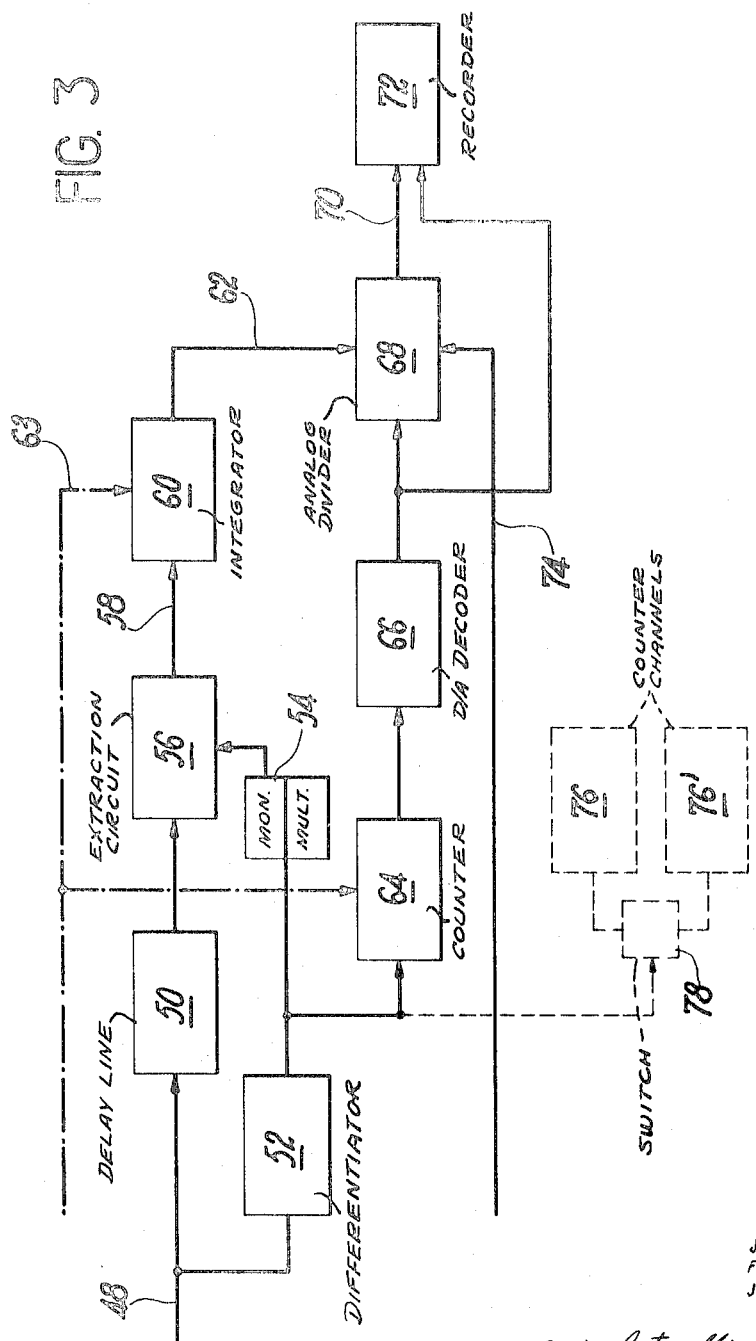
FIG. 3 is a block diagram of a circuit which can be incorporated in the device of FIG. 2 for supplying additional characteristics of the signal.
Figure 4:
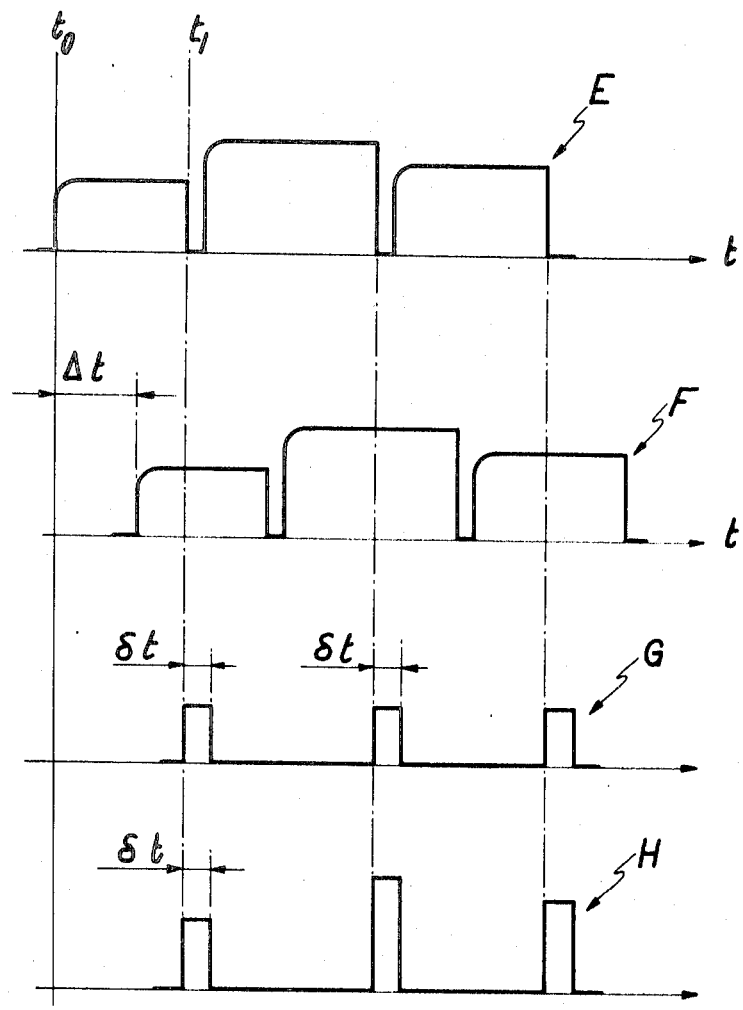
FIG. 4 is a diagram showing the variation in time of the signals employed in the circuit of FIG. 3.

The device which is represented in FIG. 3 comprises a true delay line 50 which is supplied from the input 48: a square wave applied to the input from the instant $t_0$ to the instant $t_1$ (curve E in FIG. 4) is delayed (curve F) by a time interval $\Delta t$ ($\Delta t = 100$ sec., for example) without any change in amplitude. The square waves are also applied to a control arm comprising a differentiator 52 which supplies a control peak at each trailing edge of a square wave (instant $t_1$). Said control peak triggers a monostable multivibrator 54 which delivers a control square signal having a duration $\epsilon t$ which is distinctly shorter than $\Delta t$. An extraction circuit 56 which is supplied by the time-delay circuit 50 and controlled by the monostable multivibrator 54 delivers at its output 58 a square signal having a length $\epsilon t$ and an amplitude which is proportion to that of the input square wave in the delay line 50 (curve H). The extraction circuit 56 is advantageously constituted by a linear gate comprising an input field-effect transistor which therefore has a high input impedance.

The output 58 of the extraction circuit 56 is applied to an integrating circuit 60 which sums the amplitudes and supplies at its output 62 a voltage which is proportional to the sum of the slopes from the time of previous resetting effected by applying a pulse to an input 63.

The device also comprises a circuit for counting the number of nystagmic jerks consisting of a counter 64 (three decades are usually sufficient), said counter being supplied by peaks which are each representative of one jerk: the counter 64 can be supplied, for example, from the output of the differentiator 52. The counter 64 can be of any conventional type such as, for example, a counter of the bistable circuit type. The digital output of said counter is transmitted to a digital-analog decoder 66 which supplies a voltage proportional to the number of jerks.

In this manner, the ratio of the voltage representing the sum of the slopes (applied through the output 62) to the voltage representing the number of jerks is thus established by means of an analog divider 68 at instants which are determined by application of a setting-up order to an input 74. The mean slope is thus obtained at the output 70 and written in a recorder 72.

The recording operation which is carried out upon receipt of the setting-up order which is applied to the input 72 of the divider is followed by an order for zero resetting of the integrator 60 and the counter 64 (the input being shown in chain-dotted lines in FIG. 3).

The number of jerks can be placed in the recorder 72 at the same time as the mean value of the slopes simply by simultaneous writing of the output voltage of the decoder 66. A conventional two-channel recorder of the galvanometer type can be employed for this purpose. Thus, one of the galvanometers will receive the voltage which is applied through the input 70 and which represents the mean value of slope while the other galvanometer will receive a voltage which is proportional to the number of jerks derived from the decoder 66.

The device of FIGS. 2 and 3 can further be completed by a counting circuit serves to determine the number of jerks which take place both towards the right-hand side and left-hand side during each period of oscillation of the pendular armchair in which the patient is seated. This parameter is sometimes of interest for the correct interpretation of nystagmus.

The counting circuit can be of very simple design. The circuit shown in dashed lines in FIG. 3 is provided at the output of the differentiator 52 with a switching unit 78 which, depending on their sign, directs the output pulses from the differentiator 52 towards either of the two channels 76 and 76' which are each constituted by one counter. Other solutions could be contemplated: it would thus be possible to employ a single counter followed by a buffer storage device which, after each count in a given direction, receives the indications contained in the counter and frees this latter for the following count. In all cases, setting-up can be effected in digital form by controlling by means of an auxiliary program the printing of indications contained in the counter or alternatively in analog form by digital-analog decoding (whereupon the writing operation is no longer carried out in the form of a printed impression but in the form of a graphic recording).

The invention is evidently not limited to the form of execution which has been illustrated and described by way of example and it will be readily understood that the scope of this patent extends to alternative forms of either all or part of the arrangements herein described which remain within the scope of equivalent means as well as to any unit for the practical application of the invention such as a device for processing physiological signals.

What we claim is:

1. A method of measurement of the slope of electric pulses constituting a signal which may be accompanied by a high background noise, wherein said method comprises the steps of:

generating a sawtooth wave having a known slope in synchronism with each of said pulses and of continuously dividing the amplitude of each of said pulses by the amplitude of the sawtooth wave, whereby a ratio signal, representative of the slope of each of said electric signals being measured, is obtained.

2. A device for measuring the slope of electric pulses constituting a signal which may be accompanied by a high background noise comprising a generator for producing sawtooth waves of constant and known slope, means for triggering said generator in response to a pulse whose slope is to be measured and an analog dividing circuit which receives the pulse to be measured and the sawtooth wave which is delivered from the generator, whereby a ratio signal, representative of the slope of each of said electric pulses measured, is obtained.

3. A device is accordance with claim 2, wherein said device comprises a differentiating circuit to which said signal is applied, the output of said circuit being coupled to the control input of the sawtooth wave generator in order to release said generator in response to a transient portion of a pulse.

4. A device in accordance with claim 2 wherein said device comprises two separate differentiating circuits each responsive to one polarity of said pulses, the output of said circuits being coupled to the control input of the sawtooth wave generator in order to release said generator in response to a transient portion of a pulse.

5. A device in accordance with claim 4, wherein each differentiator is associated with a permission circuit for supplying an inhibition signal to the other differentiator for a predetermined time-duration after the emission by the first differentiator of a peak corresponding to said transient portion, said time-duration being shorter than the time interval which elapses between two pulse trains of opposite polarity.

6. A device in accordance with claim 2, wherein said device comprises a circuit disposed in the path of transmission of said pulses to said divider for zero resetting of the origin of the pulses.

7. A device in accordance with claim 2, wherein said device also comprises a circuit supplied by said divider for calculating the mean value of pulse slopes over a predetermined period.

8. A device in accordance with claim 7, wherein said device comprises a circuit for counting said pulses during said period of time.

9. A device in accordance with claim 8, wherein said circuit for calculating the mean value of pulse slopes comprises a shaping stage for generating in respect of each pulse a signal of fixed duration having an amplitude which is proportional to the slope, an integrator connected to the output of said shaping stage and a divider connected to the integrator and to the counter circuit.

10. A method of measuring the slopes of a train of pulses within a signal each of said pulses being comprised of a first portion having a substantially constant slope and a second portion, the absolute value of the slope of said second portion of each signals being smaller than the absolute value of the slope of said first portion, comprising the steps of:
differentiating each of said pulses:
generating a sawtooth signal, in synchronism with each of said pulses, the period of each sawtooth increment corresponding to the period of each of said first and second portions of each of said pulses; and
continuously dividing the amplitudes of each of said pulses by the amplitude of said sawtooth signal, to provide a ratio signal representative of the slopes of said train of pulses.

11. A method in accordance with claim 10, further including the steps of:
transforming said train of pulses into first and second respective sequences of pulses of opposite polarity with intervals of time between pulse in each sequence during which no pulses occur; and
delaying one of said sequences of pulses with respect to the other sequence for a period of time shorter than the duration of each pulse in the other sequence.

* * * * *